March 6, 1951     J. H. BOOTH     2,544,582
BEARING ASSEMBLY FOR STEERING LINKAGE AND THE LIKE
Filed March 4, 1946     2 Sheets-Sheet 1
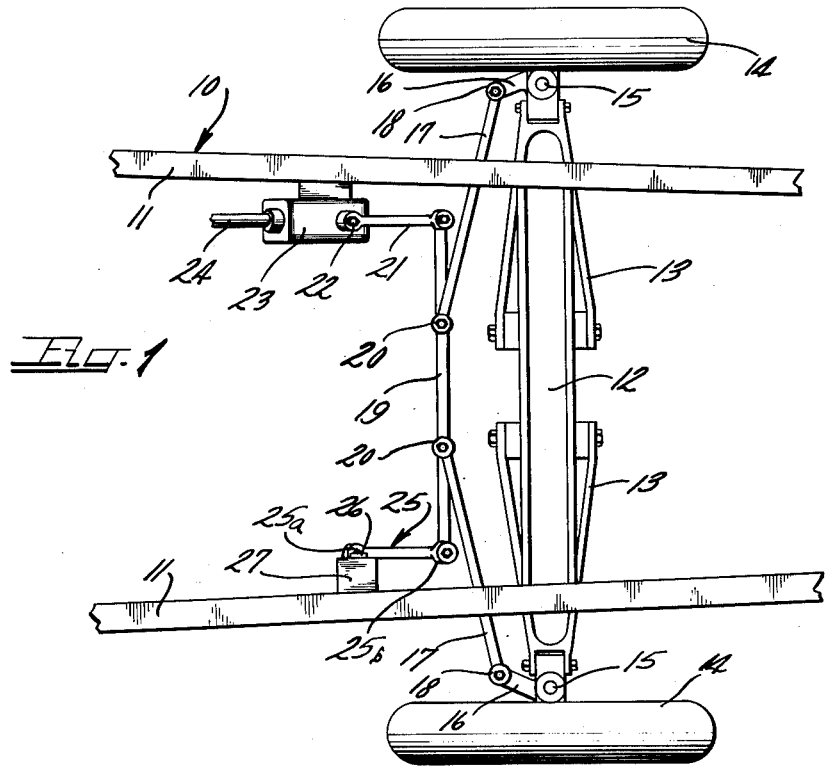
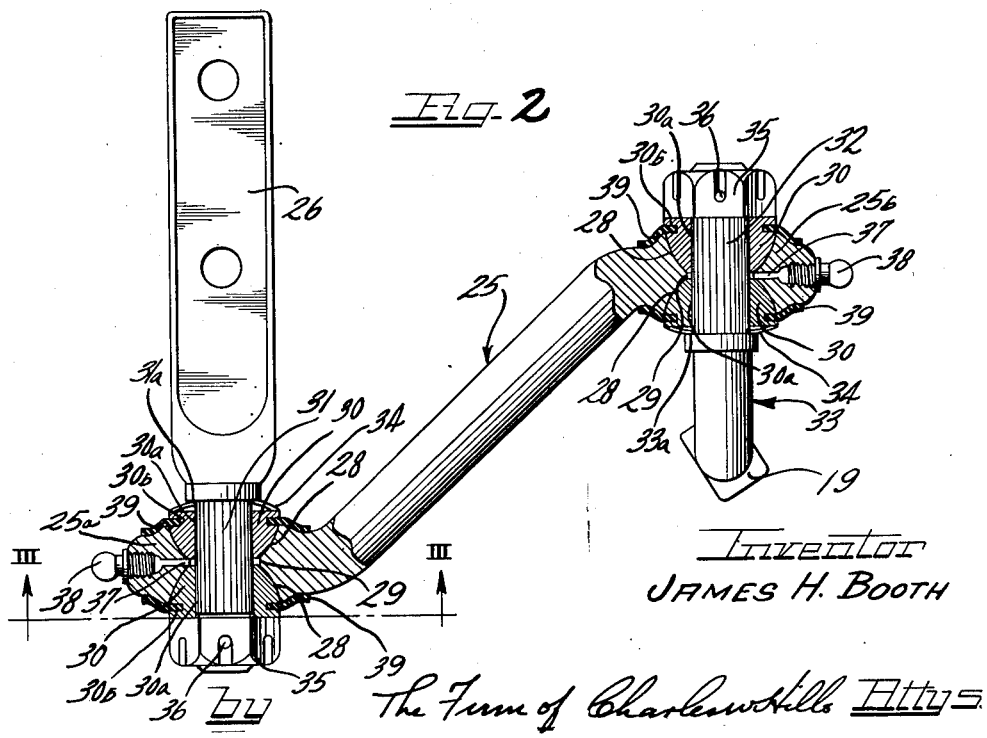
Inventor
JAMES H. BOOTH
by The Firm of Charles W. Hills Attys

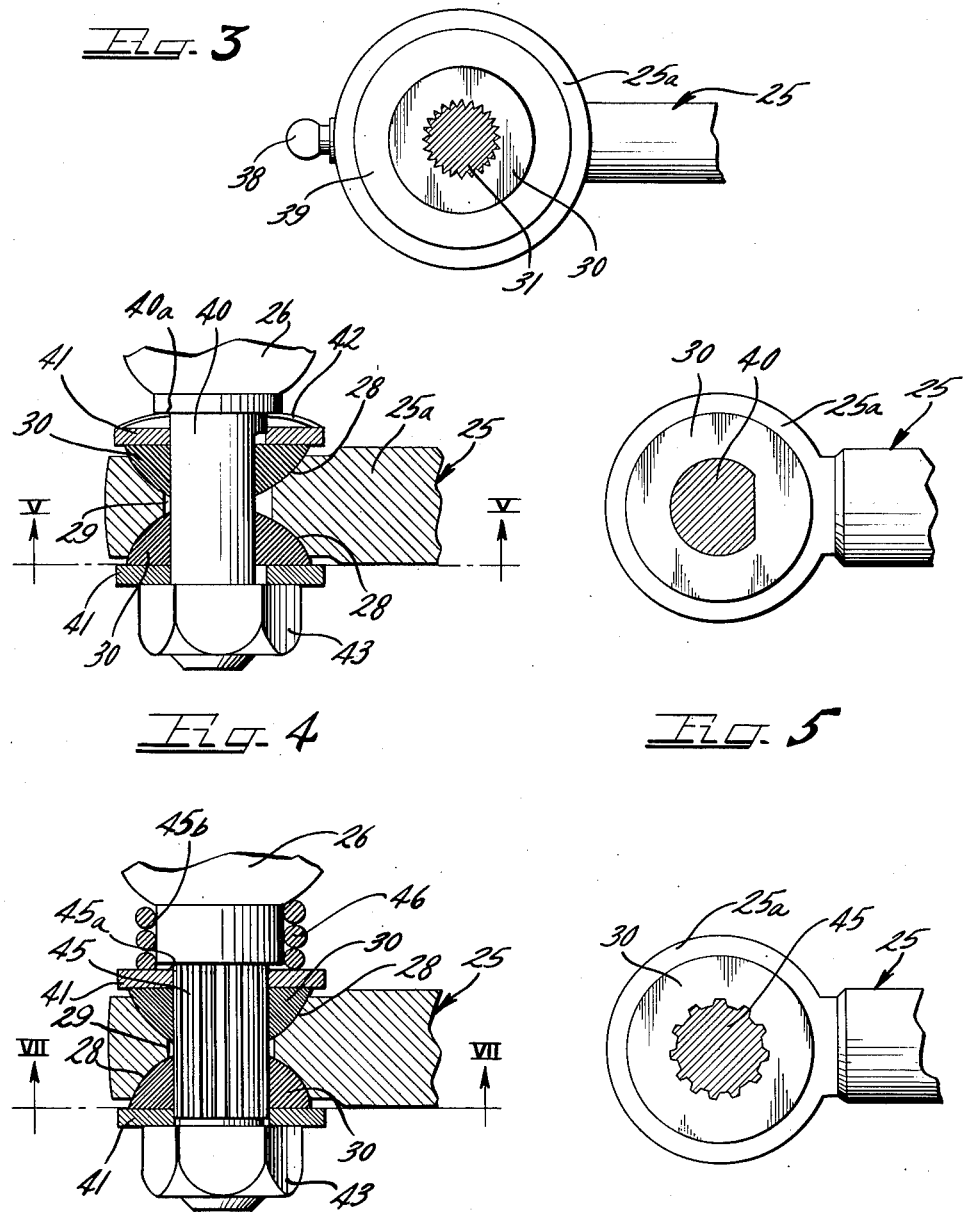

Patented Mar. 6, 1951

2,544,582

UNITED STATES PATENT OFFICE 2,544,582

BEARING ASSEMBLY FOR STEERING LINKAGE AND THE LIKE

James H. Booth, Detroit, Mich., assignor to Thompson Products, Inc., Cleveland, Ohio a corporation of Ohio Application March 4, 1946, Serial No. 651,800

10 Claims. (Cl. 280—95)

1

This invention relates to bearing assemblies accommodating rotative movement only but adapted to resist pounding and thrust loads without interfering with the rotative movements.

Specifically, the invention deals with an idler arm for the cross link of parallelogram steering linkage on dirigible vehicles such as automobiles.

The invention will hereinafter be specifically described as embodied in an idler arm for automotive steering linkages, but it should be understood that the principles of this invention are generally applicable to bearing assemblies and therefore the invention is not limited to the specifically illustrated embodiments.

In parallelogram steering linkages of automotive vehicles, the cross link is actuated at one end by the pitman arm that is swung from the gear box of the steering column. The other end of the cross link must be supported so as not to interfere with straight longitudinal movement of the cross link by the pitman arm.

In accordance with this invention, an idler arm is suspended from the frame of the automotive vehicle on a forged bracket attached to the frame, and is pivoted for swinging movement on this bracket. This idler arm extends forwardly in parallel relation to the pitman arm and pivotally suspends the end of the cross link remote from the end connected to the pitman arm. The idler arm can only swing in one plane, and is effective to hold the cross link against movement with the sole exception of that movement imparted to the cross link by the pitman arm. The idler arm, according to this invention, has a pair of opposed ball segments seated in each end thereof to afford adequate thrust load-carrying bearing walls and to permit free swinging of the idler arm. The ball segments are centrally apertured and receive mounting studs therethrough in non-rotatable relation. One mounting stud depends from the bracket attached to the automobile frame. The other mounting stud projects upwardly from the end of the cross link. The stud on the bracket is in transverse alignment with the swinging center of the pitman arm. The idler arm is of the same length as the pitman arm so that the stud received in the swinging end of the idler arm is always transversely aligned with the swinging end of the pitman arm. Thus, parallelogram longitudinal movement of the cross link is insured.

A feature of this invention resides in the provision of wear take-up means urging the opposed

2 ball segments in each end of the idler arm toward each other to prevent looseness from developing in the bearing assembly, and to insure a fixed swinging center for the idler arm.

Another feature of the invention resides in holding the opposed ball segments in slidable but non-rotatable relation on the stud received through the apertures of the ball segments. This construction eliminates chattering and looseness which might otherwise occur between the stud and ball segments.

Since the ball segments seat in ball seats formed in the ends of the idler arm, extended opposed bearing surfaces are provided which will not bind even when the assembly is subjected to high thrust loads and shock loads, such as might occur when the vehicle is operating over bumpy roads.

It is, then, an object of this invention to provide a bearing assembly accommodating rotative movement only and having opposed converging bearing walls adapted to support heavy thrust and shock loads without binding.

A further object of the invention is to provide a bearing assembly having a pair of opposed ball members converging toward each other and riding in complementary opposed ball socket walls in a single housing.

A further object of this invention is to provide an idler arm for automotive steering linkages that will support heavy shock loads without binding and without deviating from a predetermined path of swinging movement.

Another object of this invention is to provide an idler arm for parallelogram-type automotive steering linkages which will not chatter, bind, or loosen even after prolonged heavy-duty usage.

A further object of this invention is to provide an idler arm for automotive steering linkages with an automatic wear take-up bearing that will not bind or loosen even after prolonged usage.

A still further object of the invention is to provide a ball and socket-type joint which will accommodate relative movement of the joint parts only in one plane.

Other and further objects of this invention will be apparent to those skilled in the art from the following detailed description of the annexed sheets of drawings which, by way of preferred examples only, illustrate three embodiments of the invention.

On the drawings:

Figure 1 is a fragmentary top plan view of an automobile chassis having a parallelogram-type steering linkage equipped with an idler arm according to this invention.

Figure 2 is a side elevational view, with parts in vertical cross section, of the idler arm of this invention, and illustrating the manner in which the arm is pivotally suspended from a bracket, and the manner in which the cross link of a parallelogram steering linkage is pivotally suspended from the idler arm.

Figure 3 is a fragmentary horizontal cross-sectional view, with parts in bottom plan, taken along the line III—III of Figure 2.

Figure 4 is a fragmentary vertical cross-sectional view, with parts in side elevation, of another form of bearing for the idler arm of this invention.

Figure 5 is a fragmentary horizontal cross-sectional view with parts in bottom plan taken along the line V—V of Figure 4.

Figure 6 is a view similar to Figure 4 but illustrating another modified bearing arrangement according to this invention.

Figure 7 is a horizontal cross-sectional view with parts in bottom plan taken along the line VII—VII of Figure 6.

As shown on the drawings:

In Figure 1 the reference numeral 10 designates generally an automobile chassis having side beams 11, 11 and a transverse beam 12. Wheel arms 13, 13 are pivoted on the transverse beam 12 and support the front wheels 14, 14 of the vehicle. These wheels are rotated on sub-axles (not shown) pivoted on king pins 15, 15. Steering arms 16, 16 extend rearwardly from the sub-axle assemblies. Tie rods 17, 17 are connected to the steering arms 16, 16 through ball and socket type joints 18, 18. The tie rods 17, 17 extend inwardly to the cross link 19 of a parallelogram-type steering linkage, and are connected thereto by means of ball and socket type joints 20, 20. One end of the cross link 19 is pivoted to a pitman arm 21 suspended on the rock shaft 22 of a steering column gear box 23 carried on a side frame beam 11. A steering column 24 rotates the rock shaft 22 to swing the pitman arm 21 and thereby longitudinally shift the cross link 19 for swinging the wheels 14 about their king pins 15 to thereby steer the vehicle. The other end of the cross link 19 is connected to the idler arm 25 of this invention. The idler arm 25 is suspended from a bracket 26 secured to adjacent side frame beam of the vehicle by means of a pad or other mounting 27.

As shown in Figure 2, the idler arm 25 has opposite eye ends 25a and 25b each with opposed semi-ball shaped bearing walls 28, 28 therein. One bearing wall 28 of each eye end converges inwardly from the top face of the eye to a reduced diameter cylindrical portion 29 intermediate the top and bottom faces of the eye ends. The other bearing wall 28 converges inwardly from the bottom face of the eye to the cylindrical portion 29.

Fragmental ball members 30, 30 are seated on the opposed bearing walls 28, 28. The fragmental ball members 30, 30 in the eye end 25a have coaxial apertures 30a, 30a broached onto a serrated stud 31 depending from the bracket 26. The opposed fragmental ball members 30 in the eye end 25b have coaxial apertures 30a, 30a broached onto the serrated portion 32 of a stud 33 extending upwardly from the end of the cross link 19. As best shown in Figure 3, the serrations of the stud members bite into the apertures of the ball members 30 to prevent relative rotating movement between the ball members and studs. However, the serrations extend longitudinally of the stud, and do not interfere with relative longitudinal movement of the stud and ball members.

The stud 31 has a top shoulder 31a overlying the top ball member 30 in the eye end 25a. A Belleville or dished type spring washer 34 is interposed between this shoulder 31a and the top face of the top ball member 30. A nut 35 is threaded onto the bottom end of the stud 31 into thrusting engagement with the bottom face of the bottom ball member 30 in the eye end 25a. The nut 35 is preferably castellated to receive a cotter pin 36 passed through the threaded end of the stud 31 to lock the nut on the stud. The nut is tightened sufficiently to compress the Belleville washer 34 and thereby draw the opposed ball members 30, 30 into full seating engagement with the top and bottom semi-ball shaped bearing walls 28, 28.

The stud 33 has a shoulder 33a underlying the bottom face of the bottom ball member 30 in the eye end 25b and a Belleville washer 34 is interposed between this shoulder and the bottom face of the bottom ball member, as shown. The top end of the stud 33 is threaded and receives a nut 35 therearound to thrust against the top face of the top ball member 30 in the eye end 25b. The nut is tightened sufficiently to compress the Belleville washer 34 and the ball members 30, 30 in the eye end 25b are thus urged toward each other into full seating engagement with the semi-ball shaped bearing walls 28 of the eye end 25b.

A lubricant passage 37 is preferably provided in each eye end 25a and 25b to communicate with the chamber between the ball segments 30, 30 provided by the cylindrical wall 29 in each eye end. A lubricant fitting 38 is threaded into each eye end to supply lubricant through the passageway 37 into the eye end for lubricating the bearing walls.

To prevent ingress of dirt and loss of lubricant, flexible wiper type seals 39, composed of rubber, leather, plastic or the like sheet material, are carried in grooves around each ball member 30, 30 to overlie the top and bottom faces of the eye ends 25a and 25b. These flexible seals will ride on the top and bottom faces of the eye ends as the idler arm 25 swings relative to its stud.

In the form of idler arm shown in Figure 2, the arm extends upwardly from the stud 31 so that the eye end 25b overlies the cross link 19. It should be understood, however, that the idler arm can extend beneath the cross link if desired and need not be upwardly inclined.

The stud passing through the opposed ball members in the eye end 25a of the idler arm prevents relative tilting movements of the ball members and the arm can thus only swing in a single plane. It is held for such swinging movement about the fixed center provided by the stud 31 of the fixed bracket 26. This stud is transversely aligned with the rock shaft 22 on which the pitman arm 21 is carried. The cross link 19 therefore is held at its opposite ends on fixed swinging centers, and straight parallelogram movement of the link is maintained. Likewise, the stud 33 holds the ball members 30 in the eye end 25b against tilting, and the cross link 19 is thus held against swinging except in the swinging plane of the end 25b of the idler arm.

The cooperating opposed fragmental spherical top and bottom bearing walls of the ball members and eye ends of the idler arm provide extended bearing surfaces which will smoothly accommodate swinging movement without binding. As wear develops on the bearing surfaces, the spring washers 34 are effective to urge the ball members further into their ball seats to thereby prevent looseness from developing in the joint assemblies even after prolonged heavy-duty usage.

The serrations on the stud prevent rotation of the stud in the ball members so that all rotative movements are borne on the segmental spherical outer walls of the ball members.

In the embodiment of the invention shown in Figures 4 and 5, parts identical with parts described in Figures 1 and 2 have been marked with the same reference numerals. In Figures 4 and 5, the bracket 26 has a depending stud 40 of D-shaped cross section and the ball members 30, 30 have D-shaped coaxial apertures therethrough for receiving the stud 40 therein in non-rotatable relation. In this arrangement, it is not necessary to broach the ball members onto the stud, since the D-shaped cross section will prevent relative rotation between the stud and ball members and still permit sliding movement of the ball members on the stud.

Washers 41 overlie the top and bottom faces of the ball members 30. A Belleville spring washer 42 is interposed between the top washer 41 and a shoulder 40a of the stud. A nut 43 threaded on the stud 40 thrusts the bottom washer 41 against the bottom face of the bottom ball member 30. The bearing assembly operates in the same manner as described in connection with Figures 1 and 2.

In the third embodiment of the invention shown in Figures 6 and 7, identical parts have been marked with the same reference numerals. In this embodiment the bracket 26 has a splined stud 45 depending therefrom. The splined teeth extend longitudinally of the stud. The ball members 30 have complementary longitudinally splined coaxial apertures slidably splined on the stud 45. The ball members are thus free to slide on the stud but cannot rotate relative to the stud. Washers 41 such as are used in the embodiment shown in Figures 4 and 5 overlie the top and bottom faces of the ball members and the top washer 40 is bottomed on a shoulder 45a of the stud 45. Bottom washer 41 is engaged by the nut 43 threaded on the bottom end of the stud 45. A coil spring 46 surrounds a cylindrical portion 45b of the stud and is held under compression between the bracket 26 and the top washer 41 to act on the washer for slidably urging the ball members 30 toward each other into full seating engagement with the socket bearing walls 28. This third embodiment of the invention thus operates in the same manner as the first and second embodiments described hereinabove.

From the above descriptions it will be clear that this invention provides efficient, smooth-acting, bearing assemblies accommodating only rotative movements in one plane, and adapted to support heavy-duty thrust loads. The bearing assemblies are equipped with automatic wear take-up means to prevent looseness from developing between the parts.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. An idler arm for the cross link of a steering assembly which comprises a member having parallel eye ends in different planes substantially parallel to a horizontal plane through said cross link and connected by an inclined rod, each of said eye ends having opposed bearing walls converging inwardly from opposite faces thereof to a point intermediate the ends of the eye, opposed bearing members on said bearing walls converging in the same directiong as said walls, a stud passed through both bearing members in each eye end, means on said stud cooperating with means in said bearing members to hold the stud and bearing members against relative rotating movements while allowing relative longitudinal movements, and spring means interposed between said stud and one of said bearing members in each eye end urging the bearing members toward each other to provide an automatic wear take-up arrangement.

2. A bearing assembly comprising a housing having opposed converging bearing walls and a central connecting passage, converging bearing members seated on said bearing walls, a serrated stud extending through both bearing members and through said connecting passage of the housing, and said bearing members being broached onto said serrated stud to be in slidable but non-rotatable relation thereon.

3. A bearing assembly comprising an open ended housing having bearing walls converging inwardly from the open end to a central connecting passage intermediate said ends, bearing members on said walls having outer bearing surfaces converging in the same direction as said walls, said bearing members having D-shaped apertures therethrough, a stud of D-shaped cross section passed through said apertures and through said central connecting passage, and means on said stud clamping the bearing members against the bearing walls of the housing.

4. A bearing assembly comprising an open-ended housing having bearing walls converging inwardly from the open ends thereof to an intermediate connecting passageway therein, bearing members having external converging bearing surfaces engaging said bearing walls, each of said bearing members having splined passageways therethrough, a splined stud extending through said splined passageways of the bearing members and through said intermediate connecting passage, said bearing members being slidably splined on said splined stud for co-rotation therewith, and means on said stud urging said bearing members toward each other to hold the external bearing surfaces of said bearing members in bearing engagement with said bearing walls of the housing.

5. A bearing assembly comprising an open-ended housing having bearing walls converging inwardly from the open ends thereof to an intermediate connecting passageway therein, bearing members having external converging bearing surfaces engaging said bearing walls, said bearing members having peripherally grooved portions projecting from the ends of the housing, wiper type seals engaged in said grooved portions and overlying the ends of the housing in wiping sealing engagement therewith, a stud extending through the bearing members and housing, means on the stud acting on the bearing members to hold their external surfaces in bearing engagement with said bearing walls of the housing, said housing having a lubricant passage comunicating with said intermediate connecting passageway thereof, and a lubricant fitting on said housing for feeding lubricant to said passage.

6. In an idler arm having eye end portions for connection to the cross link in a parallelogram type steering linkage, the improvement of parallel sockets in the opposite ends of the arm disposed in planes substantially parallel to a horizontal plane through the cross link, each socket comprising a socket housing integral with said idler arm and having opposed inwardly converging bearing walls on opposite sides thereof, opposed bearing members in said socket housing having bearing surfaces in bearing engagement on the bearing walls thereof and converging in the same direction as the bearing walls, a stud extending through said socket housing and through the opposed bearing members, means connecting said stud and said bearing members for co-rotation, and means held under compression between said stud and one of said bearing members for urging the members toward each other in the direction of convergence of the bearing walls of said socket housing to maintain bearing engagement of the bearing members on said bearing walls.

7. In an idler arm having eye end portions for connection to the cross-link of a parrallelogram type steering linkage, a joint structure at each end portion in a plane substantially parallel to a horizontal plane through the cross link and comprising a socket integral with said idler arm, opposed fragmental spherical bearing seats in said socket converging inwardly from opposite faces of the socket, ball members having bearing surfaces in bearing engagement on said bearing seats, a stud extending through said socket and through the ball members therein, means connecting said ball members and stud for co-rotation while allowing relative longitudinal movement between the stud and the ball member, and means urging said ball members toward each other to automatically take up looseness developed by usage of the idler arm.

8. A bearing assembly comprising a housing having internal opposed segmental spherical bearing surfaces, opposed bearing members in bearing engagement on said bearing surfaces, a stud extending through both bearing members and having a shoulder portion limiting the upward movement of the bearing assembly, a spring washer disposed about said stud between said housing and the shoulder of said stud, and means on said stud for engaging said bearing members in slidable but non-rotatable relation whereby said bearing assembly may be displaced a limited distance axially on said stud against the resistance of said spring washer.

9. A bearing assembly comprising a housing having internal opposed segmental spherical bearing surfaces, opposed bearing members seatable on said bearing surfaces, and a stud extending through both of said bearing surfaces in slidable but non-rotatable relation thereon, whereby thrust loads axially of said stud in one direction are carried by one bearing member and thrust loads in the other direction are carried by the other bearing member while rotative movement of the stud is borne by both members.

10. A bearing assembly comprising a housing having internal opposed segmental spherical bearing surfaces, opposed bearing members seatable on said bearing surfaces, a stud extending through both of said bearing members in slidable but non-rotatable relation thereon, and having a shoulder portion to limit the axial movement of said stud, whereby thrust loads axially of said stud in one direction are carried by one bearing member and thrust loads in the other direction are carried by the other bearing member while rotative movement of the stud is borne by both members, and spring means between said housing and the shoulder of said stud to urge said bearing members on said bearing surfaces during rotative movement of the stud.

JAMES H. BOOTH.

REFERENCES CITED

The following references are of record in the file of this patent:

UNITED STATES PATENTS

| Number | Name | Date |
|---|---|---|
| 535,389 | Murdock | Mar. 12, 1895 |
| 1,124,282 | Bragassa | Jan. 12, 1915 |
| 1,132,348 | Hunter | Mar. 16, 1915 |
| 1,247,094 | Eibye et al. | Nov. 20, 1917 |
| 1,729,445 | Knape | Sept. 24, 1929 |
| 2,152,506 | Thorne | Mar. 28, 1939 |
| 2,215,243 | Klages | Sept. 17, 1940 |

FOREIGN PATENTS

| Number | Country | Date |
|---|---|---|
| 504,563 | Great Britain | Apr. 26, 1939 |